United States Patent [19]

Butler et al.

[11] Patent Number: 4,841,778
[45] Date of Patent: Jun. 27, 1989

[54] OPTICAL FIBER SENSOR TECHNIQUE FOR STRAIN MEASUREMENT

[75] Inventors: Michael A. Butler; David S. Ginley, both of Albuquerque, N. Mex.

[73] Assignee: The United States of America as represented by the Department of Energy, Washington, D.C.

[21] Appl. No.: 146,621

[22] Filed: Jan. 21, 1988

[51] Int. Cl.$^4$ .............................................. G01L 1/24
[52] U.S. Cl. ....................................... 73/800; 204/400
[58] Field of Search ............... 73/800; 204/1 T, 129.2, 204/400; 250/227; 356/35.5

[56] References Cited

U.S. PATENT DOCUMENTS

| | | | |
|---|---|---|---|
| 2,829,517 | 4/1958 | Kushner | 73/150 |
| 3,910,105 | 10/1975 | Hoffstedt | 73/88 A |
| 4,092,849 | 6/1978 | Maxwell | 73/101 |
| 4,603,252 | 7/1986 | Malek et al. | 250/227 |
| 4,609,871 | 9/1986 | Bobb | 250/277 T X |
| 4,671,659 | 6/1987 | Rempt et al. | 73/800 X |

OTHER PUBLICATIONS

Watkins, H. & Kolk, A., "Measurement of Stress in Very Thin Electrodeposits", *Journal of the Electrochemical Society*, vol. 108, No. 11, pp. 1018–1023, Nov. 1961.
Butler, M. A., "Optical Fiber Hydrogen Sensor", *Applied Physics Letters*, vol. 45, No. 10, Nov. 15, 1984, pp. 1007–1008.
Hughes, R. & Jarzynski, J., "Static Pressure Sensitivity Amplification In Interferometric Fiber-Optic Hydrophones", *Applied Optics*, vol. 19, No. 1, Jan. 1, 1980, pp. 98–107.

*Primary Examiner*—Jerry W. Myracle
*Attorney, Agent, or Firm*—Armand McMillan; James H. Chafin; Judson R. Hightower

[57] ABSTRACT

Laser light from a common source is split and conveyed through two similar optical fibers and emitted at their respective ends to form an interference pattern, one of the optical fibers having a portion thereof subjected to a strain. Changes in the strain cause changes in the optical path length of the strain fiber, and generate corresponding changes in the interference pattern. The interference pattern is received and transduced into signals representative of fringe shifts corresponding to changes in the strain experienced by the strained one of the optical fibers. These signals are then processed to evaluate strain as a function of time, typical examples of the application of the apparatus including electrodeposition of a metallic film on a conductive surface provided on the outside of the optical fiber being strained, so that strains generated in the optical fiber during the course of the electrodeposition are measurable as a function of time. In one aspect of the invention, signals relating to the fringe shift are stored for subsequent processing and analysis, whereas in another aspect of the invention the signals are processed for real-time display of the strain changes under study.

15 Claims, 3 Drawing Sheets

OPTICAL FIBER SENSOR TECHNIQUE FOR STRAIN MEASUREMENT

The U.S. Government has rights in this invention pursuant to contract No. DE-AC04-76DP00789 between the U.S. Department of Energy and AT&T Technologies, Inc.

BACKGROUND OF THE INVENTION

1. Field of the Invention

This invention relates generally to the measurement of mechanical strain associated with electrode reactions and, more particularly, to strain measurement during materials deposition, chemical reactions and relaxation in thin films on fine optical fibers.

2. History of the Prior Art

The processes of manufacturing microcircuits, sensitive measurement devices and various elements of computer hardware often include a step in which one or more thin films of a metal are electrodeposited onto a substrate. One of the most important factors influencing the behavior of such electrodeposited films is the strain induced by the electrodepositing process itself.

Few means are available for observing the physical structure of very thin electrodeposits. For example, the electron microscope, which has been used extensively for research on evaporated films, is of rather limited utility because its use requires rather difficult specimen preparation, and such an instrument is not usable to make dynamic measurements during the course of electrodeposition of a film. One approach, as disclosed in "Measurement of Stress in Very Thin Electrodeposits", by H. Watkins and A. Kolk, *Journal of the Electrochemical Society*, November 1961, pages 1018–1023, suggests that combining stress measurements with electron micrographs may permit better understanding of the structural detail in very thin film regions and that such stress data may be utilized to indicate the beginning of film continuity and to indicate structural change as the electroplate thickness increases. Watkins et al describe a modified form of the Brenner-Senderoff contractometer that provides greater sensitivity through the use of jeweled bearings and optical readout for determining quantitive stress data in films as thin as 40 A average thickness, with electron micrographs of the film made to help in interpreting the stress data.

It should also be appreciated that certain types of very precise sensors and instrumentation employ optical fibers coated with very thin metallic films to make physical or chemical measurements. An example of such a device is disclosed in "Optical Fiber Hydrogen Sensor", by M. A. Butler, *Appl. Phys. Lett.*, 45 (10), Nov. 15, 1984, wherein an optical fiber is coated with palladium which expands on exposure to hydrogen to change the effective optical path length of the fiber, this change being detected by interferometric techniques. Earlier experiments have demonstrated this effect and suggest a high sensitivity and a wide dynamic range for this kind of sensor.

U.S. Pat. No. 4,092,849, to Maxwell, discloses an apparatus and a method for measuring the elastic properties of polymer melts and polymer solutions, including measurement of the force required to shear a specimen, in order to determine the modulus of elasticity, stress and steady state viscosity of the specimen. In this apparatus, a specimen of the material to be tested is placed within an intervening space between two coaxial members, both of which are capable of low friction rotation about a common axis so that one member is forcibly rotated with respect to the other to shear the specimen. The member that is not forceably rotated is then released, and measurements of the recoverable strain and rate of strain recovery are made by measuring the motion of the released member as a function of time, with amplification of the motion provided by conveying light along a length of optical fiber disposed substantially normal to the axis of the moving member. Pulses of light are periodically provided into a portion of the optical fiber aligned with the axis, to be conveyed along the length of the optical fiber radially outward from the axis and through a small portion aligned parallel to the axis for projection onto a photographic film to record the changing position over time of the light projected from the optical fiber end.

Devices of the type discussed hereinabove, while each serving a specific need, do not provide or suggest a satisfactory solution to the need for information on the strain generated during the process of electrodeposition in a thin film, chemical, biological or physical reactions in or with such a thin film and relaxation within the structure of a thin film during, for example, a hiatus in the electrodeposition process. A need, therefore, clearly exists for a sensitive, versatile, and reliable apparatus and method for determining strain and rate of strain as functions of time in very thin films being deposited on, located on, or being removed from, substrates such as very thin optical fibers.

SUMMARY OF THE INVENTION

Accordingly, it is an object of this invention to provide apparatus for determining strain as a function of time in a fine optical fiber onto which an electrodeposition film is being applied or from which it is being removed.

It is another object of this invention to provide apparatus for making measurements of strain as a function of time in a working electrode formed of a fine optical fiber covered with an electrically conductive layer that serves as the deposition electrode in an electrochemical cell.

It is a further object of this invention to provide apparatus in which a metal-coated optical fiber element is used as a working electrode in an electrochemical cell while simultaneously serving as one arm of a Mach-Zehnder interferometer so that the optical path length of the fiber and hence the strain in the fiber can be monitored while electrochemical reactions are taking place.

It is a related object of this invention to provide a method for determining strain as a function of time in a fine optical fiber onto which an electrodeposition film is being applied or from which it is being removed.

It is another related object of this invention to provide a method for making measurements of strain as a function of time in a working electrode formed of a fine optical fiber covered with an electrically conductive layer that serves as the deposition electrode in an electrochemical cell.

It is a further related object of this invention to provide a method for monitoring the optical path length and the strain in a fiber that is metal-coated to serve as a working electrode in an electrochemical cell while simultaneously serving as one arm of a Mach-Zehnder interferometer.

It is yet another related object of this invention to provide apparatus and a method for determining the strain experienced by a portion of a system that is undergoing a chemical, electrochemical or biological event over time in a selected environment.

These and other related objects of this invention are realized, in a preferred embodiment of the apparatus of the invention, by providing laser light from a source to first and second optical fibers having substantially equal lengths and subjecting a selected portion of a length of the first optical fiber to a strain over a period of time. Each of the fibers receives a portion of the laser light from the source at respective first ends, for transmission along their respective lengths and emission out of their respective second ends as corresponding light beams to form an interference pattern. The interference pattern is received by an element that, at predetermined intervals, transduces the received interference pattern and generates corresponding signals. The transduced signals are then utilized to determine changes in the interference pattern over time and, thereby, the strain experienced by the selected portion of the first optical fiber is evaluated.

In one aspect of this invention, the selected portion of the first optical fiber has attached thereto an electrically conductive outer layer, preferably with a bonding layer intermediate the optical fiber surface and the conductive surface, with a diode array utilized for detecting individual interference fringes in the interference pattern.

In another aspect of this invention, the conductively coated portion of the first optical fiber is used as the working electrode in an electrochemical cell while simultaneously being employed as one arm of a Mach-Zehnder interferometer so that the optical path length of the fiber can be monitored while electrochemical reactions are taking place.

A preferred embodiment of the method for measuring strain according to this invention includes the steps of generating laser light at a source, directing portions of the laser light into respective first ends of first and second optical fibers of substantially equal lengths, for transmission therethrough and emission out of respective second ends of both fibers, subjecting a selected portion of a length of the first optical fiber to a strain, generating an interference pattern from the light emitted from the respective second ends of the optical fibers, transducing the interference pattern at predetermined intervals to generate corresponding signals, and processing the signals to determine changes in the interference pattern over time and, thereby, evaluating the corresponding strain experienced by the selected portion of the first optical fiber.

In one aspect of the method according to this invention, the interference pattern is received by a diode array for detection of individual interference fringes in the interference pattern, preferably at a rate at least one fringe per second when the applied strain varies over time.

In another aspect of the method of this invention, an electrically conductive layer is applied to a selected portion of the first optical fiber, preferably over a bonding layer attached thereto, and selectively adding to or removing from a surface of the electrically conductive layer an outer layer that comprises a metal.

Still other objects and advantages of the present invention will become readily apparent to those skilled in this art from the following detailed description, wherein only the preferred embodiment of the invention is shown and described, simply by way of illustration of the best modes contemplated for carrying out the invention. As will be realized, the invention is capable of other and different embodiments, and its several details are capable of modifications in various obvious respects, all without departing from the invention as disclosed herein. Accordingly, the drawings and description hereof are to be regarded as illustrative in nature only, and not as restrictive.

DESCRIPTION OF THE PREFERRED EMBODIMENTS

Figure 1:
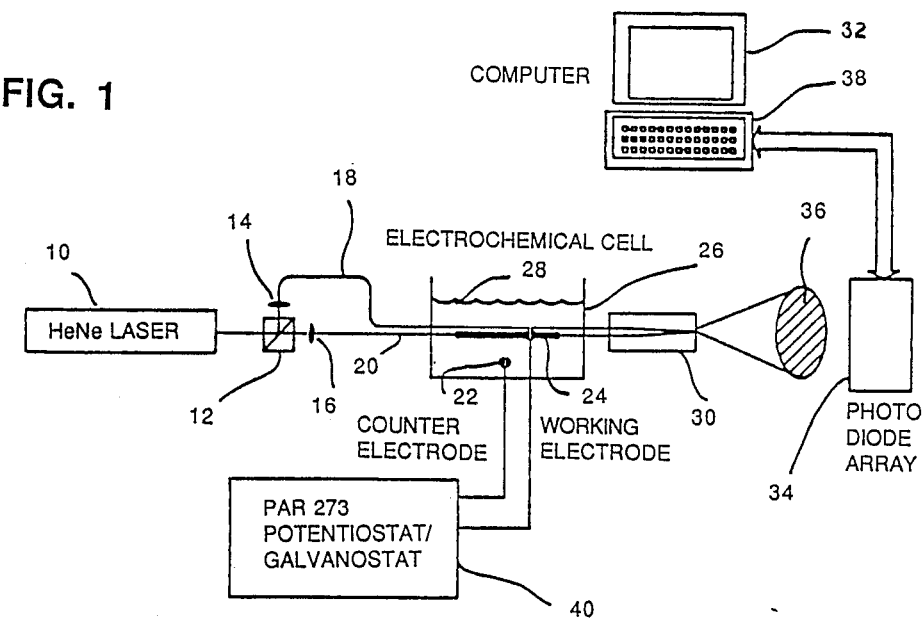
FIG. 1 schematically illustrates the principal elements of a preferred embodiment of the apparatus of this invention.

As best seen in the schematic illustration of FIG. 1, a source of laser light, preferably an He-Ne laser, such as the Spectra Physics Model 117, is utilized to provide laser light. This laser light is split into two parts by a conventional beam splitter 12 and thereafter introduced into two single mode optical fibers 18 and 20 through two microscope objectives 14 and 16, respectively, which are selected to match the numerical aperture of the fibers. The preferred optical fibers are ITT 1601 fibers, each having a 4 micron diameter core and a total diameter of 80 microns. The sensitivity of the apparatus can be improved by the use of smaller diameter optical fibers.

Figure 2:
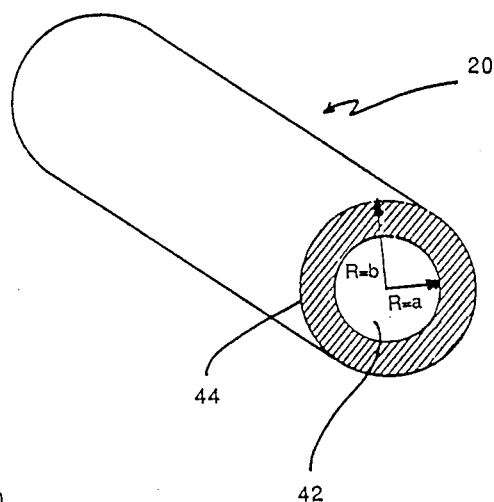
FIG. 2 is a perspective view of a portion of a coated optical fiber of the type utilized in the apparatus according to this invention.

As best seen in FIG. 2, a typical piece of optical fiber 20 has a true light-carrying core 42 of radius "a" that is coated with an outer layer of hytrel and polysilane coatings. These plastic coatings on the true light-carrying optical fiber are intended to protect the fiber from abrasion and to provide mechanical strength thereto for handling. However, when a portion of optical fiber is utilized as a sensing element in the present apparatus, this plastic coating 44 needs to be removed to provide better mechanical coupling between the fiber core and a metal coating that will act as the working electrode, as described hereinbelow. Therefore, before use of the optical fiber, the selected active portions of both fibers, for uniformity of response to temperature changes and the like, are stripped of the plastic coatings by mechanical methods followed, preferably, by a six-minute immersion in concentrated sulfuric acid. The manner in which the optical fiber is stripped off the plastic is not critical.

In a preferred embodiment of the apparatus of this invention, as illustrated in FIG. 1, the optical fibers 18 and 20 are passed through an electrochemical cell 26 containing an electrolyte 28. Electrochemical cell 26 is provided with a counterelectrode 22, preferably made of platinum. A portion of optical fiber 20, located within electrochemical cell 26, is formed into a working electrode 24. A preferred method for preparing working electrode 24 is to first strip approximately 30 centimeters of optical fiber 20 of its plastic coating 44 to expose the true optical fiber core 42 and to sputter onto the outer surface of stripped core 42 100 Å titanium layer to serve as a bonding layer. Onto this bonding layer (not shown for simplicity) is applied a second metal layer which provides an electrically conductive surface for subsequent electrochemical plating. This electrically conductive surface (not shown for simplicity) is typically selected to be between 0.5 and 1.5 microns thick and, preferably, includes a highly conductive metal such as gold. To the electrically conductive layer is attached a wire (not numbered) through which the electrodeposition electrical current is conveyed to working electrode 24. This wire is attached to the electrically conductive layer of good preferably by indium solder and the soldered portion insulating with epoxy. Other techniques for electrically coupling the wire to the conductive layer are also effective.

It is very important to match the lengths of the stripped portions of optical fibers 18 and 20, of which the stripped portion of optical fiber 20 is formed into working electrode 24. It is equally important to match the lengths of the optical fibers 18 and 20 which still retain the plastic coating 44. The respective lengths should be within + or −0.1 millimeters. The reason for this is that the large thermal expansion coefficient of the plastic material of coating 44 otherwise would cause significant interference fringe shifts when the optical fiber is subjected to temperature changes if the original coated lengths of the fibers are not carefully matched. An alternative solution is to intentionally vary the temperature while adjusting the lengths of the plastic coatings on the fibers to thereby minimize the thermally induced interference fringe shifts.

Both optical fibers 18 and 20 pass through the electrochemical cell 26 and may be conveniently brought together on a microscope slide 30. The ends of optical fibers 18 and 20 are there stripped of their plastic coatings 44 and the stripped ends are glued to the microscope slide 30 which then advantageously acts as a mechanism for removing any light which is incidentally propagated along the lengths of coating 44 on each optical fiber.

The structure described hitherto thus receives two laser beams, one through each of optical fibers 18 and 20, conveys the laser light by internal reflection along the lengths of the fibers through the electrochemical cell 26 and to the stripped ends glued to microscope slide 30, at which point the light beams emitted from the ends of the two fibers are directed to interract so as to produce an interference pattern that is diagrammatically illustrated as 32 in FIG. 1.

As persons skilled in the art will appreciate, any changes in the optical path available to the laster light conveyed through the optical core of fiber 20 within the length of working electrode 24 will cause a corresponding change in interference pattern 32. Therefore, if any outside influences act on working electrode 24 over a period of time to cause changes in the optical path provided by optical fiber 20 there will be corresponding time-dependent changes in interference pattern 32.

Interference pattern 32 is preferably projected onto a 128 linear diode arrange such as, for example, Reticon Model RL128L and Driver Electronics Model RC400A/402. This diode array is conveniently interfaced to a computer 38 through a multiprogrammer such as, for example, Hewlett Packard HP6942A, which provides the necessary clock and trigger pulses to read the diode array at predetermined intervals and also a fast analog-to-digital converter and memory to accept information generated as electrical signals from photodiode array 34. Once the data from the diode array is received by the computer it can be processed to determined the magnitude and direction of any fringe shifts with respect to corresponding prior measurements. In other words, with a supply of data from photodiode array 34 regarding changes in interference pattern 32, computer 38 can be utilized to generate real-time data on the magnitude and direction of the fringe shifts with respect to time. In the alternative, data stored together with information on related clock pulses may be subsequently processed and utilized to develop useful information on the fringe shifts at a more convenient time.

Electrochemical cell 26 is controlled in a known manner through a potentiostat/galvanostat 40 that controls the electrochemical deposition current between counterelectrode 22 and working electrode 24. As persons skilled in the art will appreciate, controls of known type (not shown for simplicity) may be readily utilized to control the temperature immediately around a working electrode and a matching length of optical fiber 18 within electrochemical cell 26 to normalize for temperature changes which, otherwise, may have an effect on the interference pattern in a manner not related to the strain being measured.

The apparatus as described hitherto enables a user to apply an electrodeposition plating onto the electrically conductive layer of working electrode 24 under the control of the potentiostat/galvanostat 40. If the electrodeposition process produces a mechanical strain in the metal layer relative to the optical fiber, i.e., an interfacial strain, some of the strain will be transmitted to the optical fiber and will change its optical length. The optical length of the optical fiber portion within working electrode 24 actually will be changed by two factors. Besides any direct changes in the physical length due to mechanical strain on the optical fiber material there will usually also be a change in the refractive index of the optical fiber material. Although these two effects tend to be in opposite directions, they do not cancel each other. See, for example, Butler, *Appl. Phys. Lett.* 45 1007, (1984) cited earlier. The resulting change in the optical path length of the optical fiber portion within working electrode 24 with respect to a corresponding length of adjacent reference optical fiber 18 causes a corresponding shift in the fringe pattern and the magnitude and direction of this change can be measured by the apparatus.

If the data vector is defined as D(i) where "i" represents the diode location and a synthetic set of data S(i-j), then the convolution of these two functions is:

$$I(j) = \sum_{i=1}^{128} D(i)S(i-j).$$ (Equation 1)

We then adjust "j" to maximize the function I(j). The difference corresponding to this value of "j" and the value determined from the previously acquired data set gives the magnitude and direction of the fringe shift with respect thereto.

Because the data set is multivalued in nature, the diode array "sees" about four fringes, so that ambiguities occur if the shift is larger than half a fringe between sequential measurements. For this reason, the time interval between successive measurements must be quite short. This can be accomplished by storing all the data as taken and processing it at a later date. However, for certain applications, it is preferable to observe the fringe shifts in real time and so, while the program to accumulate the data and display is most conveniently written in BASIC, the mathematical manipulation of the data is best done by machine language subroutines. This gives a minimum time interval (between measurements) of approximately half a second, which equals a maximum measurable fringe speed of approximately one fringe per second. The resolution of the measurement system as described herein and as discussed with respect to two applications hereinbelow, is one diode or 0.04 fringes as there are 25 diodes per fringe. Typical examples of the data obtained, processed and subsequently displayed on the computer screen may be seen in FIGS. 4 and 6–9.

Since the preferred length of the working electrode as described hereinabove involves a 30 cm length of the sensing optical fiber and since the helium neon laser has a wave length of 0.633 microns, each fringe shift corresponds to a change in optical path length $\Delta\phi\phi$ about $2.1 \times 10^{-6}$, where $\phi$ is the optical path length of the optical fiber in working electrode 24.

With this apparatus it is possible to control an electrode reaction and to simultaneously monitor changes in strain at the center of the optical fiber within the working electrode 24. The key to interpreting the data is to relate the measured strains at the fiber center to the stresses set up in the electrode surface and its bulk by the electrochemical reaction.

In summary, the present system is designed to evaluate the strain in a thin solid film in real time as a function of a variety of changing conditions, both chemical and mechanical. Unlike the system of Maxwell, U.S. Pat. No. 4,092,849, previously city, the present system by itself will not function by itself to determine strains in liquids or solutions where there would not be good mechanical coupling of such a solution to the optical fiber through which the laser light is transmitted while the fiber is strained.

In essence, the system employs two optical fibers as a microinterferometer. Using the changes in the length of the strained fiber as compared to the reference fiber, both being maintained in the same environment and at the same temperature, measurements of strain are made with an exceptionally high degree of sensitivity. The fiber that is to be strained must be embedded in or attached securely to the material of interest. The strain in the material of interest, e.g., a thin metal film electrodeposited on the optical fiber being strained, whether tensile or compressive, varies in the applied film as force is transmitted thereby to the optical fiber to change the length of the fiber, thus causing a shift in the interference pattern generated when laser light from the strained and the referenced fibers is combined to generate an interference pattern. It is the incorporation of this microinterferometer into, for example, an electrochemical cell, which provides a highly sensitive system capable of measuring very small strain changes in very thin electrodeposited layers on the strained optical fiber.

Basically, the strain changes that are to be measured may originate from mechanical stresses in the film or substrate in which one of the optical fibers is embedded, from the deposition of a strained layer on the optical fiber, from the removal of a previously strained layer from the optical fiber, or from increases or decreases in the strain of a deposited layer due to chemical or mechanical processing thereof. The described apparatus and methods may be used to measure increases and decreases in the strain independent of increases or decreases in the mass of the deposited layer. Because this system provides a high degree of sensitivity in measuring strain, it means that processes on an almost atomic level can be examined to gain new fundamental understandings of chemical and mechanical processes. Thus, the apparatus and methods described herein are suitable for precise research applications. The fact that the optical fiber being strained is not itself destroyed during testing, unlike the techniques disclosed in prior art, means that complex processing can be examined where the reversal of strain from tensile to compressive, and vice versa, occurs over a wide range of time periods. If the strained optical fiber is incorporated in a composite, it may be utilized to provide continuous monitoring of strain changes as a function of time, providing indications of wear and/or failure before catastrophic failure of the composite occurs. Clearly, therefore, numerous uses for the apparatus and method described herein will be apparent to persons skilled in the art seeking a detailed understanding of the mechanisms that lead to failures of critical parts, e.g., in aerospace applications, safety equipment, and the like.

Experimental studies have been performed to demonstrate the capabilities of the apparatus and methods of the present invention, and these will now be described.

Figure 4:
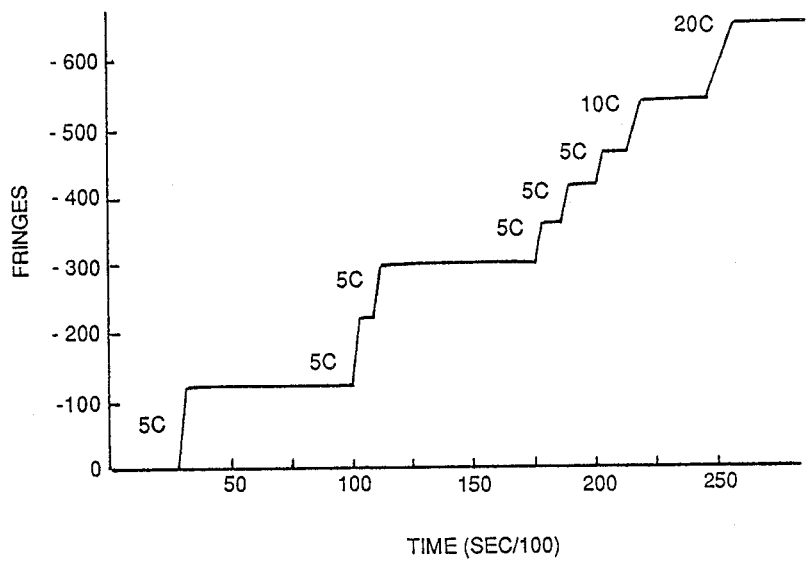
FIG. 4 is a plot of the Number of Fringes versus Time, for an experiment in which nickel was electroplated onto a fiber optic working electrode provided with a half micron thick electrically conductive layer of gold.

In one example, a 0.5 micron thick layer of gold was sputtered on the surface of the optical fiber and served as a conductive layer. Nickel metal was then plated from a standard Watts plating bath at 25° C. thereon. Using galvanostatic control and a current density of 20 mA/cm$^2$, large compressive strains were observed to grow in the optical fiber during the plating process, as illustrated in FIG. 4 hereof. Each step in FIG. 4 corresponds to the passing of a given amount of charge as indicated. No current flowed in the time intervals between each step. Growth at the rate of 2 mA/cm$^2$ appeared to induce negligible strain in the electrodeposited layer of nickel. These results show that no significant relaxation takes place in the electrode subsequent to the electrodeposition of the nickel. Thus, the strain in the optical fiber is not due to the diffusion of codeposited hydrogen out of the nickel layer after electrodeposition as was observed during electrodeposition of palladium (described in the following example). Rather, the measured strain observed during electrodeposition of nickel is an intrinsic property of the electrodeposition process itself.

Figure 5:
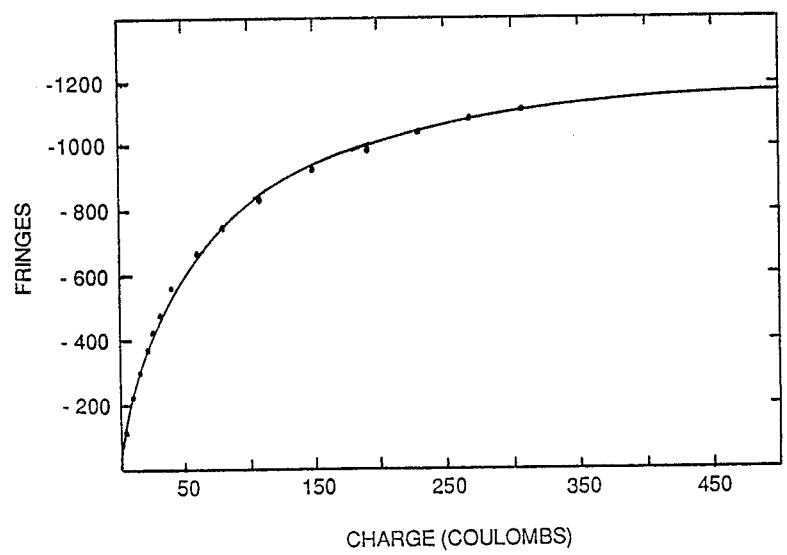
FIG. 5 is a plot of the number of fringes versus charge, to illustrate how compressive strain in an optical fiber relates to the total electrical charge used to deposit nickel thereon in an electrochemical deposition process according to this invention.

FIG. 5 is a plot illustrating the measured strain, represented by the number of fringes detected as a function of the electrical charge to deposit the nickel.

Figure 3:
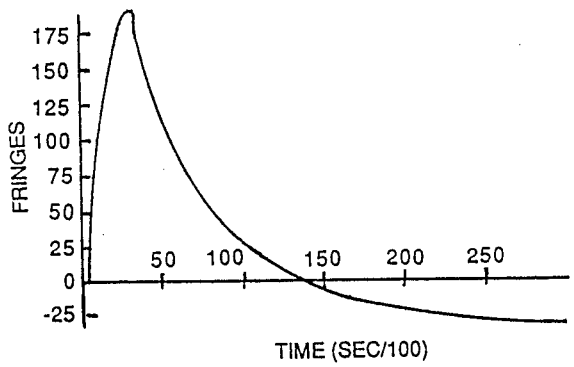
FIG. 3 is a plot illustrating the measured fringe shift as a function of time for palladium plating, as determined according to this invention.

In contrast to the results obtained in the electrodeposition of nickel, where changes in strain occur only during the plating process, the plating of palladium results in large changes in strain during the plating process as well as after the plating is stopped. FIG. 3 illustrates the results obtained during plating of palladium under galvanostatic control at a current density of 2 mA/cm$^2$. A Pallaspeed plating bath with standard additives was employed at 25° C. and a pH of 5.8. The fringe shift, corresponding to measuring strain, is plotted as a function of time for palladium plating in this manner. A total charge of 5 coulombs was passed during the plating process which occurred in the time interval from 500 to 3500 seconds during which a tensile strain is seen to grow in the fiber. After the current flow was stopped, but while the fiber was still in the plating bath, this strain was observed to relax and, after some time, a compressive strain component was observed to remain. The behavior of the palladium plating can be attributed to the codeposition of hydrogen. During the plating process, the codeposited hydrogen diffuses into the relatively thick (10 micron) palladium underlayer which therefore expands and causes the tensile strain. After the plating, all of the hydrogen diffuses out of the palladium and the residual compressive strain is believed to arise because the palladium is relaxed by removal of the codeposited hydrogen. It is believed that this is the first direct observation of a mechanism which was previously only conjectured.

Figure 6:
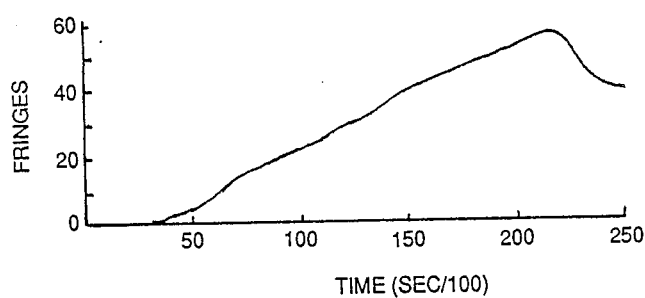
FIG. 6 is a plot of the measured fringe shift as a function of time for an anodically oxidized titanium electrode.
Figure 7:
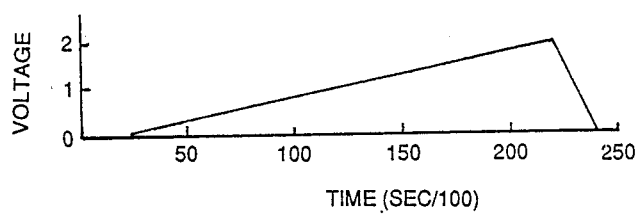
FIG. 7 is a plot of the voltage versus time relative to an SCE reference electrode.
Figure 8:
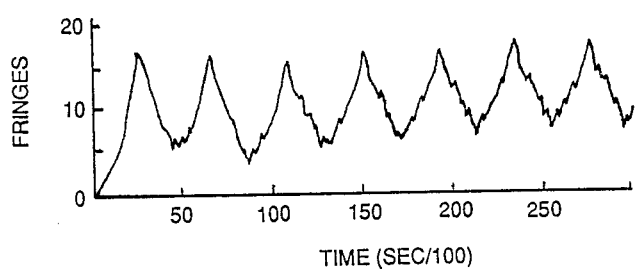
FIG. 8 is a plot of the measured fringe shift as a function of time for an anodically oxidized titanium electrode (when the electrical potential is cycled slowly between 0 and 2 volts) versus SCE.
Figure 9:
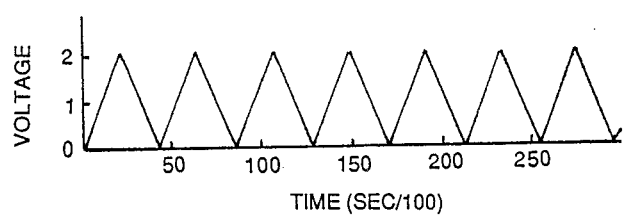
FIG. 9 is a plot of the voltage versus time for a ramp rate of 1 mV/sec for the cycling according to FIG. 8.

A third example of the type of data that may be obtained by the apparatus and method disclosed herein involves a working electrode provided with a 6 micron thick highly porous sputtered titanium layer on the sensing optical fiber, and the use of 0.2n Na$_2$SO$_4$ electrolyte. The data relating to this experiment are plotted in FIGS. 6 and 7 hereof. It should be noted that the observed tensile strain in the optical fiber has two components, one of which grows as the oxide is grown and is not removed when the electrical potential is returned to 0 V. The second component appears to be proportional to the applied electrical potential and is reversible when the potential is removed. This second "electrostrictive like" component is more clearly illustrated in the plots of FIGS. 8 and 9 hereof. With the exception of the initial ramp, the tensile strain is detected to closely follow the cyclical behavior of the applied potential. Both FIGS. 6 and 8 show some slow variations of the base line that can be attributed to the sensitivity of the apparatus to temperature changes of even a few degrees. The cyclical behavior observed and illustrated in FIGS. 8 and 9 occurred at a slow ramp speed of 1 mV/sec and less. An increase in the ramp speed to 10 millivolts per second results in irreproduceable variations in strain and a large amount of noise. A subsequent return to the slow ramp speeds thereafter does not return the cyclical variation in strain.

As persons skilled in the art will appreciate from the experimental studies discussed with reference to the examples of electrodeposition of nickel, palladium and titanium, as discussed in the immediately preceding paragraphs and figures referenced therein, the apparatus and methods of this invention provide powerful tools for detailed and sensitive studies of the nature of various electrochemical deposition phenomena.

In the area of applications, while the use of interferometric principles in a strain sensor is not totally new, it is believed that the application of the apparatus of this invention, i.e., for study of very sensitive strain changes, in chemical and biological areas is novel. This includes not only the merely electrochemical deposition aspects but a wide range of other important applications as well. In general, the apparatus of this invention is capable of observing with precision changes in any layer on the optical fiber that introduce, increase or release strain. These phenomena of interest can include, for example, deposition of material, etching to remove material, or the introduction or removal of any species or components into or from a material which causes an expansion or contraction of the material lattice structure creating a corresponding change in the strain therein. These processes need not be electrochemical in nature as conventionally understood, but may include chemical, electrochemical, and biological aspects as well. In addition, the environment within which the strain-generating events occur need not be liquid but could be solid or gaseous as well. The detailed configurations of the various elements of the apparatus, and specific details relating to various steps in practicing the method, e.g., rates, temperatures, etc., naturally will depend on the particular application envisioned.

Clearly, if the device is to be employed in all of these configurations then it need not have the particular forms disclosed therein for the preferred embodiment. In fact, as long as the sensing fiber can be incorporated into a material of interest it should be capable of detecting strain changes in the material. This includes, for example, strain during the growth of epitaxial layers on semiconductor wafers, thin film modification, membrane chemistry, and investigation of materials in general as a function of derivitization or aging. Other applications will, naturally, occur to persons skilled in the art as they fully understand and appreciate the scope of the present invention.

The method for using the apparatus disclosed herein is virtually self-evident. Basically, laser light is generated, preferably with a helium neon laser source, split into two, and then directed into respective first ends of two optical fibers of substantially equal lengths so that the light is transmitted along the lengths thereof to the emitted out of the respective second ends of both fibers. A selected length of one of the optical fibers is then subjected to a strain, e.g., by the deposition thereon of a metal film by a known electrochemical deposition technique. The light emitted from the two optical fibers is combined to generate an interference pattern that varies as strain is applied to one of the optical fibers. The interference pattern is received and is transduced at predetermined intervals to generate corresponding signals, preferably through the use of a diode array having a suitable diode density so as to have a desired sensitivity or precision. The signals emanating from the transducer, e.g., the diode array, are then processed to determine changes in the interference pattern over a period of time and thereby evaluating the corresponding strain experienced by the selected portion of the optical fiber subjected to strain.

In order to interpret the strain measurements corresponding to the observed fringe shifts, it is necessary to consider: first, what changes in optical path length of the strained fiber are to be expected for a given set of strains at the fiber core and, second, what strains are generated at the fiber core for various stresses and strains induced in the working electrode, for example, the metal film being deposited on the strained fiber.

With respect to the first problem, the optical path length of a fiber sensing element, in radians, is given by:

$$\phi = (2\pi/\lambda)nl \quad \text{(Equation 2)}$$

where "n" is the index of a fraction, "λ" the free space wavelength, and "L" the length of the optical fiber subjected to strain. Changes in the optical path length are then caused by changes in either "n" or "L".

$$\Delta\phi/\phi = \Delta n/n + \Delta L/L \quad \text{(Equation 3)}$$

From equation 3, it is seen that any physical parameter that changes either "n" or "L" will result in variations in optical path length and will be detected by variations in the light passing through this fiber sensor. As persons skilled in the art will appreciate, temperature changes will cause phase shifts because of the sensitivity of both "n" and "L" to temperature changes. Thus, $$\Delta\phi/\phi = \frac{1}{n}\left(\frac{\partial n}{\partial T}\right)\Delta T + \frac{1}{L}\left(\frac{\partial L}{\partial T}\right)\Delta T \quad \text{(Equation 4)}$$

where ($\partial n/\partial T$) includes both the intrinsic temperature dependence of "n" and the extrinsic dependence through density changes. For example, for bare silica fibers it is known that the phase shift due to temperature changes for a one meter long fiber is 107 radians/°C.

The sensitivity of the interferometric sensor to temperature variations is reduced because a differential measurement is made between the two optical fibers held close together at the same temperature. Thus, it is important to match the physical properties of the two fibers and their environments as closely as possible, and this includes their lengths, their compositions, and the length of the plastic coatings thereon because the influence of temperature affects these as well. For these reasons, it is believed that temperature fluctuations determine the lower limit of sensitivity for these devices.

Referring again to Equation 3, it is seen that the second term on the right side of the equation is just the axial strain at the fiber core. Variations in "n" can come from axial and radial strains at the fiber core since both effect the density of the material. Taking this into account, it has been shown, e.g., by R. Hughes and J. Jarzynski, *Appl. Optics* 19, page 98 (1980) that:

$$\Delta\phi/\phi = e_z - \frac{n^2}{2}\{2e_R(P_{11} - P_{44}) + e_z(P_{11} - 2P_{44})\} \quad \text{(Equation 5)}$$

where $P_{11}$ and $P_{44}$ are Pockels coefficients and $e_Z$ and $e_R$ are the axial and the radial strains at the fiber core, respectively. It should be noted that variations in length result in phase shifts of a sign opposite to that due to variations in the refractive index. However, the two terms do not, in general, cancel. Using parameters appropriate to the experiments described hereinabove, i.e., $P_{11} = 0.125$, $P_{44} = -0.0178$, and $n = 1.46$, per Hughes et al, Equation 5 reduces to:

$$\Delta\phi/\phi = 0.71 e_z - 0.42 e_R \quad \text{(Equation 6)}.$$

Thus, from Equation 6 it is seen how strains in the axial and radial direction on a cylindrical optical fiber are related to fringe shifts.

Persons skilled in the art, familiar with such theoretical considerations, should readily be able to apply the apparatus and method of this invention to other geometries, materials, and combinations of physical parameters.

The very high sensitivity of the apparatus and method of this invention makes them particularly suitable, for example, for research on and accurate monitoring of different processes, changes in the chemical, biological or physical properties of materials during processing, and measurements of changes in stress (and strain) during various chemical, electrochemical and biological events or operations that a material is subjected to.

In this disclosure, there are shown and described only the preferred embodiments of the apparatus and method of this invention, but, as aforementioned, it is understood that this invention is capable of use in various other combinations and environments and is capable of changes and modifications within the scope of the inventive concept as expressed herein. This disclosure, therefore, is to be taken as illustrative only and not as restrictive, the scope of the invention being defined only by the claims appended hereinbelow.

What is claimed is:

1. A system for measuring strain, comprising:
   means for providing laser light;
   first and second optical fibers having substantially equal lengths, a selected portion of the length of said first optical fiber being subjectible to a strain over time, each of said fibers receiving a portion of said laser light at its first end for transmission along said length for emission out of its second end as a corresponding light beam, said corresponding light beams combining to form an interference pattern;
   strain applying means comprising an electrically conductive layer attached to a surface of said portion of said first optical fiber;
   light transducing means for receiving said interference pattern for transducing the same at predetermined intervals and for generating corresponding signals; and
   means for processing said signals to determine changes in said interference pattern over time and thereby evaluate the corresponding strain experienced by said selected portion of said first optical fiber.

2. The system according to claim 1, further comprising:
   means for selectively adding to or removing from a surface of said electrically conductive layer an outer layer comprising a metal.

3. The system according to claim 2, wherein:
   said means for selectively adding to or removing said outer layer comprises an electrochemical cell and control means for controlling the same.

4. The system according to claim 3, wherein:
   said control means controls both an electrical current and the temperature in the region immediately around said first and second optical fibers within said electrochemical cell.

5. The system according to claim 1, wherein:

said strain-applying means comprises a bonding layer intermediate said surface of said selected portion and said electrically conductive layer.

6. The system according to claim 5, wherein:
said bonding layer comprises sputtered titanium.

7. The system according to claim 6, wherein:
said bonding layer has a thickness of approximately 100 Å.

8. The system according to claim 5, wherein:
said bonding layer comprises sputtered titanium and has a thickness of approximately 100 Å;
said conductive layer comprises gold and has a thickness in the range 0.5 to 1.0 micron; and
a counter electrode in said electrochemical cell comprises platinum.

9. The system according to claim 1, wherein:
said conductive layer comprises gold.

10. The system according to claim 9, wherein:
said conductive layer has a thickness in the range 0.5 to 1.0 micron.

11. A method for measuring time-dependent strain associated with a physical, chemical, electrochemical, or biological event involving a system comprising the steps of:

generating laser light;

attaching an electrically conductive layer to a surface of a selected portion of the length of a first optical fiber;

directing said laser light into respective first ends of the first and of a second optical fibers of substantially equal lengths, transmitting said laser light through said fiber lengths and emitting the same out of respective second ends of said fibers;

subjecting a selected portion of the length of said first optical fiber to a time-dependent strain generated by said event, by placing and maintaining said selected portion of said first fiber in close contact with said event; said event consisting of adding to or removing from a surface of said electrically conductive layer an outer layer comprising a metal;

generating an interference pattern from said light emitted from said respective second ends as said fibers;

transducing said interference pattern at predetermined intervals to generate corresponding signals; and processing said signals to determine changes in said interference pattern over time and thereby evaluate the corresponding strain experienced by said selected portion of said first optical fiber.

12. The method according to claim 11, comprising the further steps of:

forming a bonding layer on said selected portion of said first optical fiber for said attachment of said electrically conductive layer thereby.

13. The method according to claim 12, wherein:
said adding to or removing of said outer layer is effected by electrodeposition.

14. The method according to claim 13, wherein:
said electrodeposition is effected in an electrochemical cell.

15. The method according to claim 14, wherein:
said electrodeposition is effected by controlling an electrodepositon current and the temperature immediately around said first and second optical fibers within said electrochemical cell.

* * * * *